United States Patent
Butcher et al.

(10) Patent No.: US 9,886,568 B2
(45) Date of Patent: Feb. 6, 2018

(54) SYSTEMS AND METHODS FOR SECURE REMOTE MANAGEMENT CONTROLLER RESET

(71) Applicant: Dell Products L.P., Round Rock, TX (US)

(72) Inventors: Wade Andrew Butcher, Cedar Park, TX (US); Elie Antoun Jreij, Pflugerville, TX (US); Timothy M. Lambert, Austin, TX (US); Hendrich M. Hernandez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 14/656,856

(22) Filed: Mar. 13, 2015

(65) Prior Publication Data
US 2016/0266637 A1 Sep. 15, 2016

(51) Int. Cl.
*G06F 21/00* (2013.01)
*G06F 21/31* (2013.01)
*G06F 1/32* (2006.01)

(52) U.S. Cl.
CPC ............ *G06F 21/31* (2013.01); *G06F 1/3209* (2013.01)

(58) Field of Classification Search
None
See application file for complete search history.

(56) References Cited

U.S. PATENT DOCUMENTS

| 6,266,721 | B1* | 7/2001 | Sheikh | G06F 1/20 709/217 |
| 7,290,277 | B1* | 10/2007 | Chou | H04L 63/08 713/152 |
| 8,234,253 | B1* | 7/2012 | Tyurin | G06F 11/1438 707/675 |
| 8,528,046 | B2* | 9/2013 | Lambert | G06F 11/2284 380/279 |
| 8,973,113 | B1* | 3/2015 | Eatough | G06F 21/31 726/6 |
| 2004/0064743 | A1* | 4/2004 | Bolian | G06F 1/26 713/300 |
| 2005/0257041 | A1* | 11/2005 | Wallenstein | G06F 1/24 713/2 |
| 2008/0184028 | A1* | 7/2008 | Anson | G06F 21/74 713/156 |
| 2009/0204831 | A1* | 8/2009 | Cousson | G06F 1/3203 713/322 |
| 2010/0107241 | A1* | 4/2010 | Jaber | G06F 21/31 726/18 |

(Continued)

*Primary Examiner* — Maung Lwin
(74) *Attorney, Agent, or Firm* — Jackson Walker L.L.P.

(57) ABSTRACT

In accordance with embodiments of the present disclosure, an information handling system may include a processor, a network interface communicatively coupled to the processor, a management controller communicatively coupled to the processor and configured to provide management of the information handling system via a communications channel physically isolated from the network interface, and a controller. The controller may be configured to filter for a packet indicative of a request to remotely reset the management controller and, in response to receiving the packet indicative of the request to remotely reset the management controller, perform a reset of the management controller.

21 Claims, 2 Drawing Sheets

(56) References Cited

U.S. PATENT DOCUMENTS

| | | | |
|---|---|---|---|
| 2010/0263043 A1* | 10/2010 | Xu | G06F 11/26 |
| | | | 726/17 |
| 2011/0161698 A1* | 6/2011 | Zorek | G06F 1/3203 |
| | | | 713/320 |
| 2012/0110378 A1* | 5/2012 | Fan | G06F 11/1666 |
| | | | 714/15 |
| 2012/0234923 A1* | 9/2012 | Tamma | G06F 21/34 |
| | | | 235/492 |
| 2013/0024925 A1* | 1/2013 | Venkataramani | H04L 63/083 |
| | | | 726/7 |
| 2013/0145482 A1* | 6/2013 | Ricci | G06F 9/54 |
| | | | 726/28 |
| 2013/0268697 A1* | 10/2013 | Lambert | G06F 13/4022 |
| | | | 710/11 |
| 2014/0089648 A1* | 3/2014 | Garnier | G06F 11/267 |
| | | | 713/1 |
| 2017/0123468 A1* | 5/2017 | Butcher | G06F 1/24 |

\* cited by examiner

SYSTEMS AND METHODS FOR SECURE REMOTE MANAGEMENT CONTROLLER RESET

TECHNICAL FIELD

The present disclosure relates in general to information handling systems, and more particularly to methods and systems for secure remote reset of a management controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a management controller for providing out-of-band management facilities for management of the information handling system. Such management may be made by the management controller even if the information handling system is powered off or powered to a standby state, as a management controller may include an out-of-band network interface separate from and physically isolated from an in-band network interface of the information handling system. Such management controllers may include or may be an integral part of a baseboard management controller (BMC), a remote access controller (e.g., a Dell Remote Access Controller of Integrated Dell Remote Access Controller), an enclosure controller, or a chassis management controller (CMC).

On some occasions, the management controller, which may effectively be a "system-on-a-chip" running a set of applications upon a special purpose operating system of the management controller, may experience a lock-up or similar failure requiring reset of the management controller. Typically approaches to performing such reset, such as a manual powering off and powering on of the management controller by an individual physically present at the information handling system, are often undesirable.

SUMMARY

In accordance with the teachings of the present disclosure, the disadvantages and problems associated with existing approaches to resetting a management controller of an information handling system may be reduced or eliminated.

In accordance with embodiments of the present disclosure, an information handling system may include a processor, a network interface communicatively coupled to the processor, a management controller communicatively coupled to the processor and configured to provide management of the information handling system via a communications channel physically isolated from the network interface, and a controller. The controller may be configured to filter for a packet indicative of a request to remotely reset the management controller and, in response to receiving the packet indicative of the request to remotely reset the management controller, perform a reset of the management controller.

In accordance with these and other embodiments of the present disclosure, a method may include, in an information handling system comprising a management controller communicatively coupled to a processor of the information handling system and configured to provide management of the information handling system via a communications channel physically isolated from a network interface communicatively coupled to the processor, filtering for a packet indicative of a request to remotely reset the management controller and, in response to receiving the packet indicative of the request to remotely reset the management controller, performing a reset of the management controller.

In accordance with these and other embodiments of the present disclosure, a controller may be configured to, when disposed in an information handling system comprising a management controller communicatively coupled to a processor of the information handling system and configured to provide management of the information handling system via a communications channel physically isolated from a network interface communicatively coupled to the processor filter for a packet indicative of a request to remotely reset the management controller and, in response to receiving the packet indicative of the request to remotely reset the management controller, perform a reset of the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
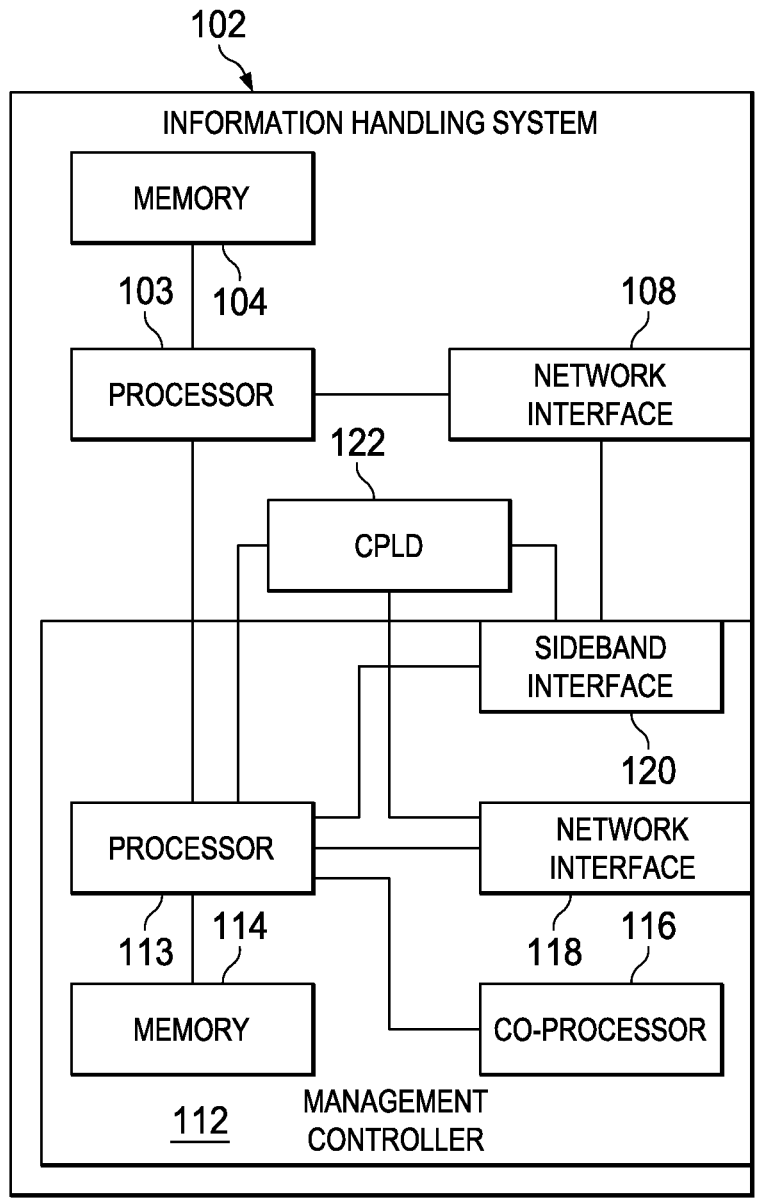
FIG. 1 illustrates a block diagram of an example information handing system, in accordance with embodiments of the present disclosure.
Figure 2:
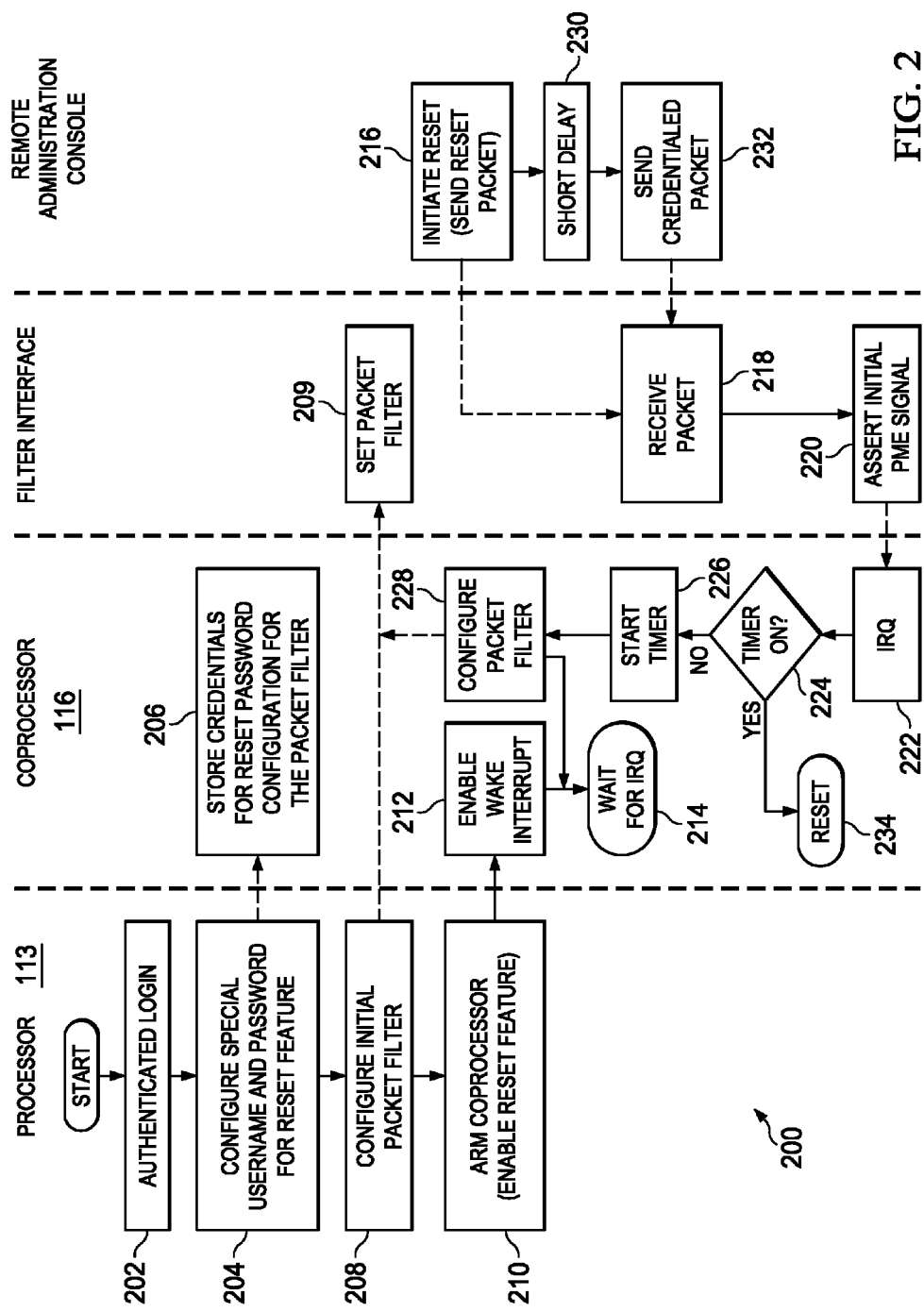
FIG. 2 illustrates a flow chart of an example method for secure remote reset of a management controller, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handing system 102, in accordance with embodiments of the present disclosure. In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a management controller 112 communicatively coupled to processor 103, and a complex programmable logic device (CPLD) 122 communicatively coupled to management processor 113.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

Management controller 112 may be configured to provide out-of-band management facilities for management of information handling system 102. Such management may be made by management controller 112 even if information handling system 102 is powered off or powered to a standby state. Management controller 112 may include a processor 113, memory 114, an out-of-band network interface 118 separate from and physically isolated from in-band network interface 108, a co-processor 116, and a sideband interface 120. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

Co-processor 116 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, co-processor 116 may comprise a specialized and/or limited function processor capable of undertaking remote reset operations for management controller 112, as described elsewhere herein.

Network interface 118 may comprise any suitable system, apparatus, or device operable to serve as an interface between management controller 112 and one or more other information handling systems. Network interface 118 may enable management controller 112 to communicate using any suitable transmission protocol and/or standard. In these and other embodiments, network interface 118 may comprise a network interface card, or "NIC."

Sideband interface 120 may comprise an interface of management controller 112 which is separate from and physically isolated from network interface 118, and which is configured to receive data from and/or communicate data to an in-band network interface 108 of information handling system 102.

CPLD 122 or another processing device may be coupled to management controller 112 and/or other components of information handling system 102. In some embodiments, CPLD 122 may be configured to perform functionality relating to remote reset operations for management controller 112, as described elsewhere herein. In these and other embodiments, CPLD 122 may include other functionality relating to the operation and/or functionality of information handling system 102.

In addition to processor 103, memory 104, network interface 108, management controller 112, and CPLD 122, information handling system 102 may include one or more other information handling resources.

FIG. 2 illustrates a flow chart of an example method 200 for secure remote reset of management controller 112, in accordance with embodiments of the present disclosure. According to some embodiments, method 200 may begin at block 202. As noted above, teachings of the present disclosure may be implemented in a variety of configurations of information handling system 102. As such, the preferred initialization point for method 200 and the order of the steps comprising method 200 may depend on the implementation chosen.

At block 202, processor 113, executing management firmware of management controller 112, may perform authenticated login of an administrator to management controller 112 (e.g., by communicating via network interface 118 or sideband interface 120 with a remote administration console application executing on an information handling system remote from information handling system 102). At block 204, processor 113 may configure special credentials (e.g., username and password) to be used in connection with remote reset of management controller 112. In some embodiments, such username and password may be configured based on user input regarding the content of the credentials. In other embodiments, processor 113 may determine the username and/or password and communicate such information to the user (e.g., administrator remotely accessing management controller 112).

At block 206, responsive to processor 113 configuring the credentials for remote reset, co-processor 116 may store such credentials (e.g., in computer-readable media integral to or otherwise accessible by co-processor 116).

At block 208, also responsive to processor 113 configuring the credentials for remote reset, processor 113 may configure an initial packet filter for a specialized or "magic" packet for initiating reset of management controller 112.

At block 209, responsive to processor 113 configuring the initial packet filter, network interface 118 may set the packet filter such that if a packet matching the filter is received, network interface 118 and other components of management controller 112 may perform special handling of the packet to perform remote reset of management controller 112.

At block 210, also responsive to processor 113 configuring the initial packet filter, processor 113 may arm or otherwise enable co-processor 116 to perform remote reset functionality. In some embodiments, block 210 may be performed only once per authenticated login to management controller 112, so as to provide security against denial of service or similar attacks attempting to access the remote reset functionality of management processor 112.

At block 212, co-processor 116 may enable receipt of a wake interrupt by co-processor 116. Thus, performance of remote reset of management controller 112 may be undertaken in a manner similar to that used for wake-on-local-area-network of information handling systems.

At block 214, in response to being enabled for receipt of a wake interrupt, co-processor 116 may begin waiting for an interrupt request (IRQ) for the wake interrupt.

After completion of block 214, management controller 112 may be configured to receive a command from a remote administration console to reset itself. The performance of such reset is set forth below with reference to blocks 216 through 234.

At block 216, an administrator at a remote administration console coupled to information handling system 102 via network interface 108 and/or network interface 118 may input a desire to remotely reset information handling system 102, and the remote administration console may initiate reset by communicating a reset packet compliant with the packet filter configured and set at steps 208 and 209, as described above. At block 218, the filter (e.g., at network interface 118) may receive the packet. At block 220, in response to receipt of a packet compliant with the packet filter set at block 209, network interface 118 may assert a power management event (PME) signal which is communicated to co-processor 116.

At block 222, co-processor 116 may, in response to receipt of the PME signal, issue an IRQ. At block 224, co-processor 116 may determine if a reset timer has been initiated and, in response to the timer not being initiated, start the timer at block 226.

At block 228, in response to issuance of the IRQ in response to the initial reset packet, co-processor 116 may configure a new packet filter for generating a co-processor interrupt, the new packet filter comprising or otherwise based on the credential information configured at block 204.

Responsive to co-processor 116 configuring the new packet filter, block 209 may execute again, only this time network interface 118 may set the packet filter such that if a packet matching the new filter is received, network interface 118 and other components of management controller 112 may perform special handling of the packet to perform remote reset of management controller 112.

Accordingly, after a short delay at 230 after sending the initial packet at block 216, the remote management console may, at block 232, send another packet including the credentialed information set at step 204.

Again at block 218, the filter (e.g., at network interface 118) may receive the credentialed packet. Again, at block 220, in response to receipt of a packet compliant with the new packet filter set at block 209, network interface 118 may assert another power management event (PME) signal which is communicated to co-processor 116.

At block 222, co-processor 116 may, in response to receipt of the additional PME signal, issue another IRQ. At block 224, co-processor 116 may determine if a reset timer has been initiated and, in response to the timer being initiated, proceed to block 234 in which co-processor 116 communicates a signal to reset management controller 112. When issuing a reset, co-processor 116 may issue a hard reset to the entire management controller 112 when information handling system 102 is in an off/auxiliary state (e.g., power state S5) and may issue a reset to processor 113 only when information handling system 102 is in an on state (e.g., power state S0) so as to not interfere with peripherals of management controller 112 (e.g., a video controller) that may be used by processor 103.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 200 or any other system operable to implement method 200. In certain embodiments, method 200 may be implemented partially or fully in software and/or firmware embodied in computer-readable media.

Alternative to the embodiments described above, co-processor 116 may issue an explicit outbound packet to a remote management console in response to the initial reset packet, rather than waiting for a timer-based timeout between receipt of the initial reset packet and the credentialed packet. For example, upon receipt of the initial packet, an interrupt service routine may be activated by co-processor 116 which issues the outbound request for credentials and then evaluates a packet received in response to the request. If the appropriate credentials are supplied and authenticated, co-processor 116 may then issue an appropriate hardware reset to management controller 112.

As another alternative to the embodiments described above, the initial reset packet communicated from the remote management console may be filtered by network interface 118, which may issue a PME to directly reset management controller 112. Thus, in such embodiments, credentialed information may be communicated in such initial reset packet and not in a separate later-issued packet including the credentialed information.

As another alternative to the embodiments described above, CPLD 122 may snoop communication between network interface 108 (e.g., a media independent interface between network interface 108 and sideband interface 120) and sideband interface 120 and/or communication into network interface 118 (e.g., a media independent interface between a PHY and the Media Access Control of network interface 118). CPLD 122 may filter packets associated with remote reset, evaluate credentials included therein, and reset management controller 112 in response to authenticating the credentials. In some of such embodiments, the authenticated values for the credentials may be preprogrammed into CPLD 122 by management controller 112.

As another alternative to the embodiments described above, network interface 108 may include an auxiliary controller or co-processor which may filter the packets for reset and may perform functionality of co-processor 116 as described above with respect to FIG. 2. In such embodiments, a wake signal for performing a "wake-on-LAN" of processor 103 may be overloaded in order to achieve efficient and feasible pinouts for network interface 108, and the auxiliary controller or co-processor may determine from a pulse length of a received wake/reset signal whether to perform a wake of processor 103 or a reset of management controller 112.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:
1. An information handling system comprising:
a processor;
a network interface communicatively coupled to the processor;
a management controller communicatively coupled to the processor and configured to provide management of the information handling system via a communications channel physically isolated from the network interface, wherein the management controller includes a management controller processor; and
a controller configured to:
filter for a packet indicative of a request to remotely reset the management controller, wherein the filtering includes snooping for the packet on an interface coupled to at least one of the network interface and the communications channel physically isolated from the network interface; and
in response to receiving the packet indicative of the request to remotely reset the management controller, perform a reset of the management controller, wherein the reset comprises at least one of a hard reset of the management controller and a processor reset of the management controller processor.

2. The information handling system of claim 1, wherein the controller is further configured to:
after receiving the packet indicative of the request to remotely reset the management controller, filter for a second packet indicative of credentials for remotely resetting the management controller; and in response to receiving the second packet indicative of credentials for remotely resetting the management controller, perform the reset of the management controller.

3. The information handling system of claim 2, wherein the controller is further configured to, after receiving the packet indicative of the request to remotely reset the management controller, communicate a challenge in response to the packet requesting credentials for remotely resetting the management controller.

4. The information handling system of claim 1, wherein the packet indicative of the request to remotely reset the management controller includes credentials for remotely resetting the management controller.

5. The information handling system of claim 1, wherein the controller comprises a co-processor integral to the management controller.

6. The information handling system of claim 1, wherein the controller comprises a complex programmable logic device communicatively coupled to at least one of the network interface and the communications channel physically isolated from the network interface.

7. The information handling system of claim 1, wherein the controller comprises a co-processor integral to the network interface.

8. A method comprising, in an information handling system comprising a management controller communicatively coupled to a processor of the information handling system and configured to provide management of the information handling system via a communications channel physically isolated from a network interface communicatively coupled to the processor:
  filtering for a packet indicative of a request to remotely reset the management controller, wherein the filtering includes snooping for the packet on an interface coupled to at least one of the network interface and the communications channel physically isolated from the network interface; and
  in response to receiving the packet indicative of the request to remotely reset the management controller, performing a reset of the management controller, wherein the reset comprises at least one of a hard reset of the management controller and a processor reset of a management controller processor of the management controller.

9. The method of claim 8, further comprising:
  after receiving the packet indicative of the request to remotely reset the management controller, filtering for a second packet indicative of credentials for remotely resetting the management controller; and
  in response to receiving the second packet indicative of credentials for remotely resetting the management controller, performing the reset of the management controller.

10. The method of claim 9, further comprising, after receiving the packet indicative of the request to remotely reset the management controller, communicating a challenge in response to the packet requesting credentials for remotely resetting the management controller.

11. The method of claim 8, wherein the packet indicative of the request to remotely reset the management controller includes credentials for remotely resetting the management controller.

12. The method of claim 8, wherein the method is performed by a co-processor integral to the management controller.

13. The method of claim 8, wherein the method is performed by a complex programmable logic device communicatively coupled to at least one of the network interface and the communications channel physically isolated from the network interface.

14. The method of claim 8, wherein the method is performed by a co-processor integral to the network interface.

15. A controller configured to, when disposed in an information handling system comprising a management controller communicatively coupled to a processor of the information handling system and configured to provide management of the information handling system via a communications channel physically isolated from a network interface communicatively coupled to the processor:
  filter for a packet indicative of a request to remotely reset the management controller, wherein the filtering includes snooping for the packet on an interface coupled to at least one of the network interface and the communications channel physically isolated from the network interface; and
  in response to receiving the packet indicative of the request to remotely reset the management controller, perform a reset of the management controller, wherein the reset comprises at least one of a hard reset of the management controller and a processor reset of a management controller processor of the management controller.

16. The controller of claim 15, further configured to:
  after receiving the packet indicative of the request to remotely reset the management controller, filter for a second packet indicative of credentials for remotely resetting the management controller; and
  in response to receiving the second packet indicative of credentials for remotely resetting the management controller, perform the reset of the management controller.

17. The controller of claim 16, further configured to, after receiving the packet indicative of the request to remotely reset the management controller, communicate a challenge in response to the packet requesting credentials for remotely resetting the management controller.

18. The controller of claim 15, wherein the packet indicative of the request to remotely reset the management controller includes credentials for remotely resetting the management controller.

19. The controller of claim 15, wherein the controller comprises a co-processor integral to the management controller.

20. The controller of claim 15, wherein the controller comprises a complex programmable logic device communicatively coupled to at least one of the network interface and the communications channel physically isolated from the network interface.

21. The controller of claim 15, wherein the controller comprises a co-processor integral to the network interface.

* * * * *